United States Patent
Mueller et al.

(10) Patent No.: US 11,542,386 B2
(45) Date of Patent: Jan. 3, 2023

(54) LIGHT STABILIZER MIXTURE

(71) Applicant: BASF SE, Ludwigshafen am Rhein (DE)

(72) Inventors: Daniel Mueller, Kaisten (CH); Heinz Herbst, Kaisten (CH); Tania Weyland, Kaisten (CH)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 16/494,450

(22) PCT Filed: Mar. 21, 2018

(86) PCT No.: PCT/EP2018/057183
§ 371 (c)(1),
(2) Date: Sep. 16, 2019

(87) PCT Pub. No.: WO2018/177846
PCT Pub. Date: Oct. 4, 2018

(65) Prior Publication Data
US 2020/0087486 A1    Mar. 19, 2020

(30) Foreign Application Priority Data
Mar. 28, 2017 (EP) .................................... 17163379

(51) Int. Cl.
| | |
|---|---|
| *C08K 5/34* | (2006.01) |
| *C08K 5/3492* | (2006.01) |
| *C08L 23/06* | (2006.01) |
| *C08L 23/08* | (2006.01) |
| *C08L 23/12* | (2006.01) |

(52) U.S. Cl.
CPC .......... *C08K 5/34926* (2013.01); *C08L 23/06* (2013.01); *C08L 23/0853* (2013.01); *C08L 23/0869* (2013.01); *C08L 23/12* (2013.01)

(58) Field of Classification Search
CPC . C08K 5/34926; C08K 5/3492; C08K 5/3475
See application file for complete search history.

(56) References Cited

U.S. PATENT DOCUMENTS

| | | | |
|---|---|---|---|
| 4,325,863 | A | 4/1982 | Hinsken et al. |
| 4,338,244 | A | 7/1982 | Hinsken et al. |
| 4,997,938 | A | 3/1991 | Cantatore et al. |
| 5,116,893 | A | 5/1992 | Cantatore et al. |
| 5,175,312 | A | 12/1992 | Dubs et al. |
| 5,216,052 | A | 6/1993 | Nesvadba et al. |
| 5,252,643 | A | 10/1993 | Nesvadba |
| 6,046,304 | A | 4/2000 | Borzatta et al. |
| 6,051,164 | A | 4/2000 | Samuels |
| 6,117,995 | A | 9/2000 | Zedda et al. |
| 6,255,483 | B1 | 7/2001 | Fletcher et al. |
| 6,420,462 | B1 | 7/2002 | Zedda et al. |
| 6,677,451 | B2 | 1/2004 | Zedda et al. |
| 8,895,647 | B2 | 11/2014 | Menozzi et al. |
| 2001/0039341 | A1 | 11/2001 | Fletcher et al. |
| 2002/0094976 | A1 | 7/2002 | Zedda et al. |
| 2003/0045444 | A1 | 3/2003 | Fletcher et al. |
| 2005/0019281 | A1 | 1/2005 | Fletcher et al. |
| 2007/0060697 | A1 | 3/2007 | Li et al. |
| 2009/0111918 | A1 | 4/2009 | Tsou et al. |
| 2013/0267633 | A1 | 10/2013 | Vulic et al. |

FOREIGN PATENT DOCUMENTS

| | | |
|---|---|---|
| DE | 43 16 611 A1 | 11/1993 |
| DE | 43 16 622 A1 | 11/1993 |
| DE | 43 16 876 A1 | 11/1993 |
| EP | 0 589 839 A1 | 3/1994 |
| EP | 0 591 102 A1 | 4/1994 |
| EP | 1 291 384 A1 | 3/2003 |

OTHER PUBLICATIONS

Extended European Search Report dated Sep. 14, 2017 in European Patent Application No. 17163379.5, 3 pages.
International Search Report dated Apr. 20, 2018 in PCT/EP2018/057183 filed on Mar. 21, 2018.

*Primary Examiner* — Edward J Cain
(74) *Attorney, Agent, or Firm* — ArentFox Schiff LLP

(57) ABSTRACT

A stabilizer mixture containing a sterically hindered amine light stabilizer and a triazine UV absorber in a specific ratio.

15 Claims, No Drawings

LIGHT STABILIZER MIXTURE

The present invention relates to a stabilizer mixture containing a sterically hindered amine light stabilizer and a triazine UV absorber in a specific ratio, a composition containing an organic material, preferably an organic polymer, subject to degradation induced by light, heat, oxidation or the effect of agrochemical compounds, to an article made of said composition, preferably a greenhouse film cover, and to a method for stabilizing the aforementioned organic material.

In more detail, the present invention relates to a stabilizer mixture containing the components (A) and (B) wherein component (A) is at least one compound of the formula (A),

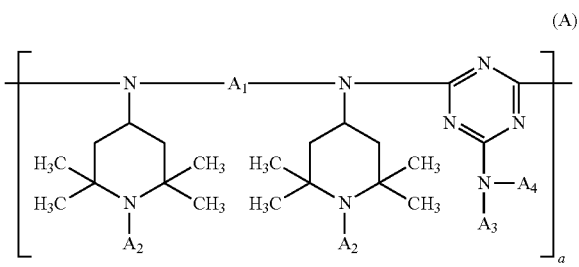

(A)

wherein $A_1$ is $C_2$-$C_{18}$alkylene, $C_5$-$C_7$cycloalkylene or $C_1$-$C_4$alkylenedi($C_5$-$C_7$cycloalkylene), the radicals $A_2$ independently of one another are hydrogen, $C_1$-$C_{12}$alkyl, $C_1$-$C_{12}$alkyloxy, $C_5$-$C_{12}$cycloalkyl or $C_5$-$C_{12}$cycloalkyloxy, $A_3$ and $A_4$ independently of one another are hydrogen, $C_1$-$C_{12}$alkyl, $C_5$-$C_{12}$cycloalkyl or a group of the formula (a-1),

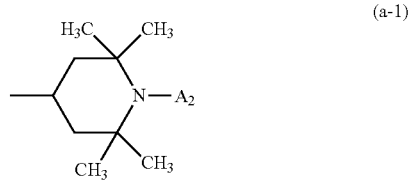

(a-1)

or the radicals $A_3$ and $A_4$, together with the nitrogen atom to which they are bonded, form a 5- to 10-membered heterocyclic ring and a is a number from 1 to 20 and the repeating units are identical or different; and component (B) is at least one compound of the formula (B),

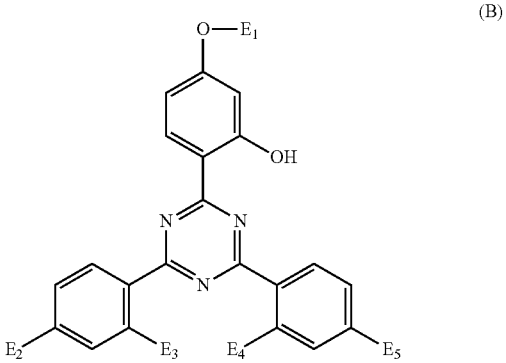

(B)

wherein $E_1$ is $C_1$-$C_{18}$alkyl and $E_2$, $E_3$, $E_4$ and $E_5$ independently of one another are hydrogen, $C_1$-$C_{18}$alkyl, phenyl or phenyl substituted by 1, 2 or 3 $C_1$-$C_4$alkyl; and the weight ratio of the components (A) to (B) is 23/1 to 40/1 or 23/1 to 35/1 or 23/1 to 34/1 or 23/1 to 33/1 or 30/1 to 33/1.

Examples of alkyl having up to 18 carbon atoms are methyl, ethyl, propyl, isopropyl, n-butyl, sec-butyl, isobutyl, tert-butyl, 2-ethylbutyl, n-pentyl, isopentyl, 1-methyl-pentyl, 1,3-dimethyl-butyl, n-hexyl, 1-methyl-hexyl, n-heptyl, isoheptyl, 1,1,3,3-tetra-methyl-butyl, 1-methyl-heptyl, 3-methyl-heptyl, n-octyl, 2-ethyl-hexyl, 1,1,3-tri-methyl-hexyl, 1,1,3,3-tetra-methyl-pentyl, nonyl, decyl, undecyl, 1-methyl-undecyl, dodecyl, 1,1,3,3,5,5-hexa-methyl-hexyl, tridecyl, tetradecyl, pentadecyl, hexadecyl, heptadecyl and octadecyl.

Examples of $C_1$-$C_{12}$alkyloxy are methoxy, ethoxy, propoxy, isopropoxy, butoxy, isobutoxy, pentoxy, isopentoxy, hexoxy, heptoxy, octoxy and decyloxy. $C_1$-$C_8$alkyloxy, in particular propoxy, is preferred.

Examples of $C_5$-$C_{12}$cycloalkyl are cyclopentyl, cyclohexyl, cycloheptyl, cyclooctyl and cyclododecyl.

Examples of $C_5$-$C_{12}$cycloalkyloxy are cyclopentoxy, cyclohexoxy, cycloheptoxy, cyclooctoxy, cyclodecyloxy and cyclododecyloxy. Cyclohexoxy is preferred.

A preferred examples of phenyl substituted by 1, 2 or 3 $C_1$-$C_4$alkyl is 2,4-dimethylphenyl.

Examples of $C_2$-$C_{18}$alkylene are ethylene, propylene, trimethylene, tetramethylene, pentamethylene, 2,2-dimethyltrimethylene and hexamethylene.

An example of $C_5$-$C_7$cycloalkylene is cyclohexylene.

An example of $C_1$-$C_4$alkylenedi($C_5$-$C_7$cycloalkylene) is methylenedicyclohexylene.

Where the radicals $A_3$ and $A_4$, together with the nitrogen atom to which they are bonded, form a 5- to 10-membered heterocyclic ring, this ring is for example 1-pyrrolidyl, piperidino, morpholino, 1-piperazinyl, 4-methyl-1-piperazinyl, 1-hexahydroazepinyl, 5,5,7-trimethyl-1-homopiperazinyl or 4,5,5,7-tetramethyl-1-homopiperazinyl. Morpholino is particularly preferred.

In the compounds of the formula (A) the terminal group attached to the diamino residue is for example hydrogen or a group of the formula

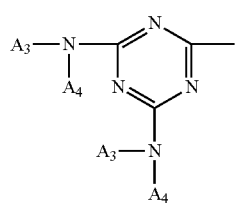

and the terminal group attached to the triazine radical is for example a group of the formula

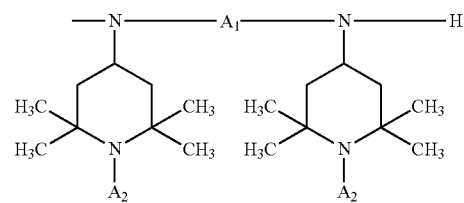

or a group of the formula

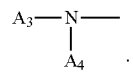

The stabilizer mixtures wherein
$A_1$ is $C_2$-$C_8$alkylene or cyclohexylene,
the radicals $A_2$ independently of one another are hydrogen, $C_1$-$C_8$alkyl, $C_1$-$C_{12}$alkyloxy, cyclohexyl or cyclohexyloxy,
$A_3$ and $A_4$ independently of one another are hydrogen, $C_1$-$C_8$alkyl or a group of the formula (a-1) or the radicals $A_3$ and $A_4$, together with the nitrogen atom to which they are bonded, form a morpholino group,
a is a number from 1 to 10,
$E_1$ is $C_1$-$C_8$alkyl and
$E_2$, $E_3$, $E_4$ and $E_5$ independently of one another are hydrogen, $C_1$-$C_4$alkyl or phenyl, are preferred The following compounds of formula (A) are preferred:

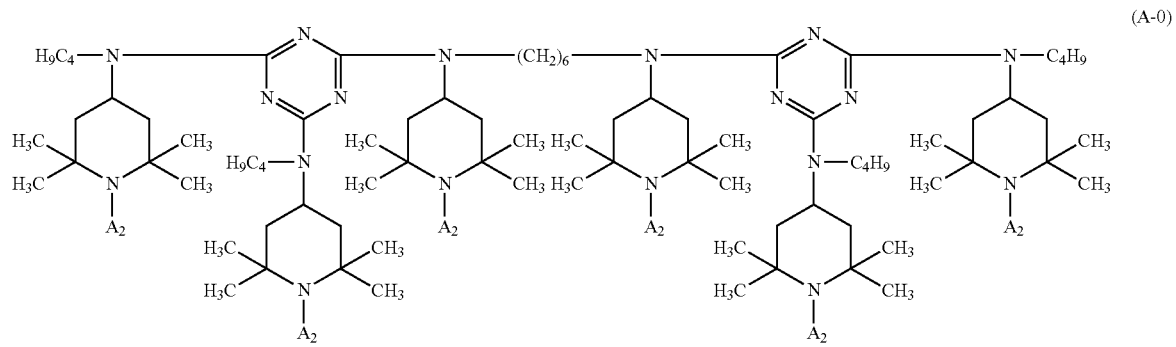

(A-0)

wherein 1 or 2 of the radicals $A_2$ are hydrogen and the remaining radicals $A_2$ are propyloxy,

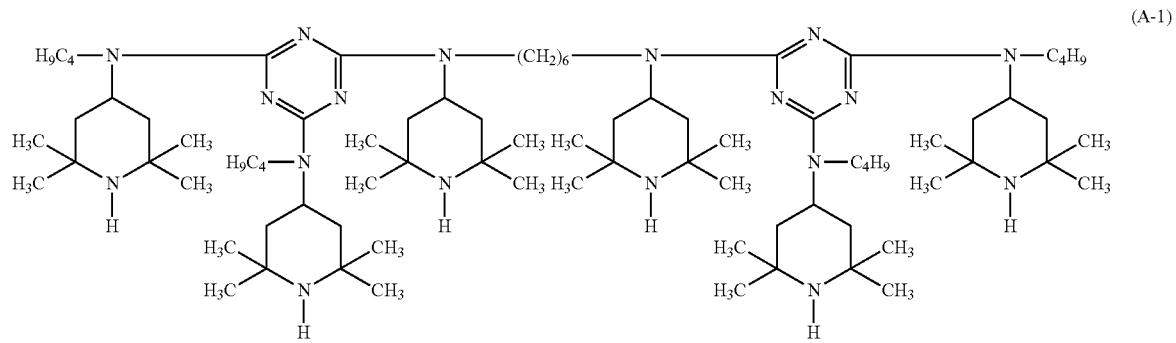

(A-1)

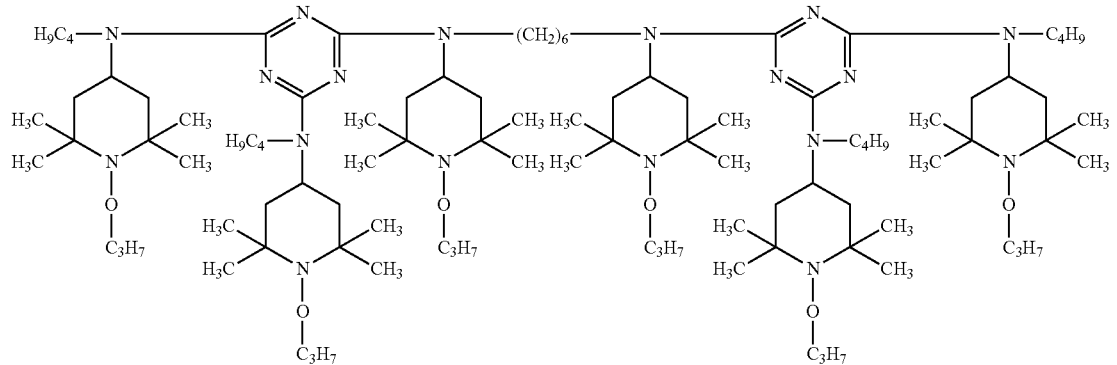
(A-2)
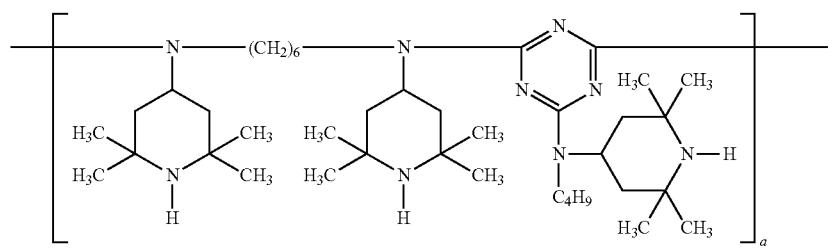
(A-3)
wherein a is a number from 1 to 20, for example 1 to 10, 2 to 20 or 2 to 10;
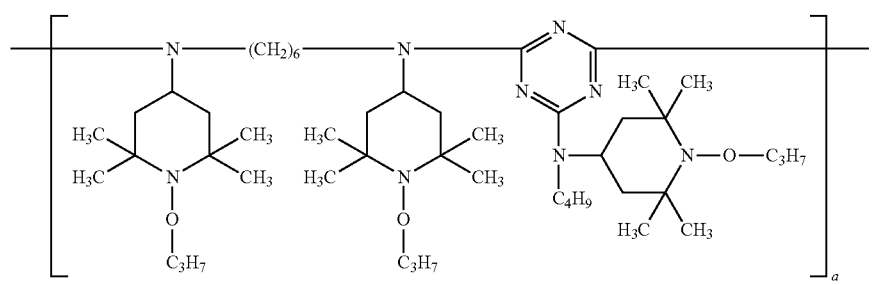
(A-4)

wherein a is a number from 1 to 20, for example 1 to 10, 2 to 20 or 2 to 10.

The following compounds of formula (B) are preferred:

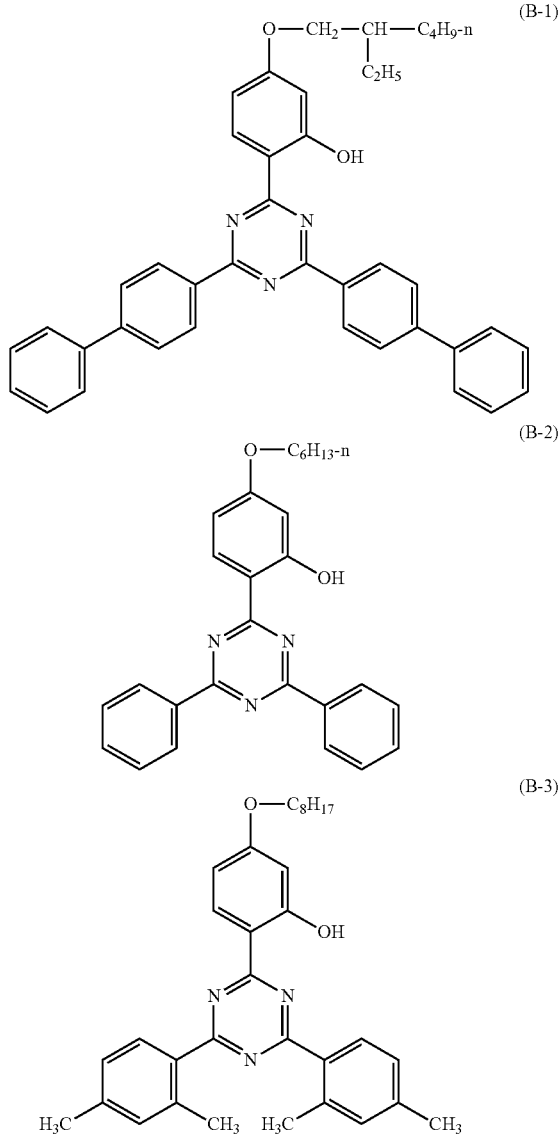

Most of the compounds of the formulae (A) and (B) are known and can be prepared in analogy to processes known to those skilled in the art.

The compounds of the formula (A) can be prepared for example in analogy to the methods described in U.S. Pat. Nos. 4,997,938, 5,116,893, 8,895,647, 6,046,304, 6,117,995, 6,420,462 and 6,677,451.

The compounds of the formula (B) can be prepared for example in analogy to the methods described in U.S. Pat. No. 6,255,483.

According to a preferred embodiment, the stabilizer mixture contains an additional component (C) which is a benzotriazole.

Examples of suitable benzotriazoles are 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl) benzotriazole, 2-(2'-hydroxy-5'-(1,1,3,3-tetramethylbutyl) phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methylphenyl) benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]benzotriazole; 2-[2'-hydroxy-3'-(1,1,3,3-tetramethylbutyl)-5'-(α,α-dimethylbenzyl)-phenyl] benzotriazole.

2-(2'-hydroxy-5'-(1,1,3,3-tetramethylbutyl)phenyl)benzotriazole is preferred as component (C).

The weight ratio of components (A) to (C) is preferably 1:3 to 1:12.

According to a further preferred embodiment the stabilizer mixture additionally contains a component (D) which is at least one compound selected from the formulae (D-1) and (D-2).

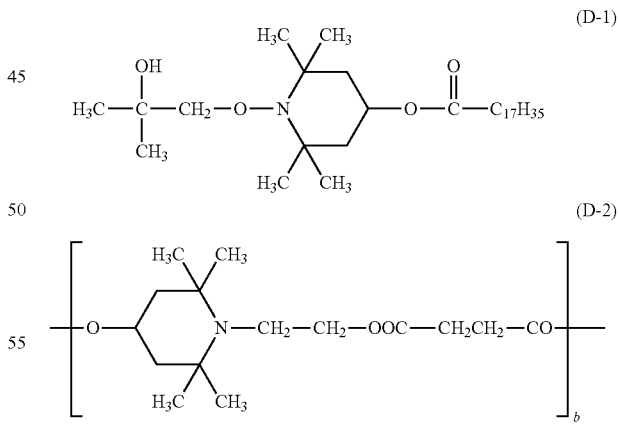

wherein b is a number from 2 to 20.

The weight ratio of components (A) to (D) is preferably 20:1 to 1:1.

In the compound of the formula (D-2) the end group attached to the oxygen is for example hydrogen and the end group attached to the —CO— group is for example —O—C$_1$-C$_3$alkyl depending on the preparation.

Another embodiment of the present invention is a composition containing (I) an organic material, preferably an organic polymer, in particular a polyolefin, subject to degradation induced by light, heat, oxidation or agrochemical compounds and (II) a stabilizer mixture as defined above.

Examples of the organic material to be stabilized are

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cyclo-olefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylenepropylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimides, polyesterimides, polyhydantoins and polybenzimidazoles.

18. Polyesters derived from dicarboxylic acids and diols and/or from hydroxycarboxylic acids or the corresponding lactones or lactides, for example polyethylene terephthalate, polybutylene terephthalate, poly-1,4-dimethylolcyclohexane terephthalate, polyalkylene naphthalate and polyhydroxybenzoates as well as copolyether esters derived from hydroxyl-terminated polyethers, and also polyesters modified with polycarbonates or MBS. Copolyesters may comprise, for example—but are not limited to—polybutylenesuccinate/terephthalate, polybutyleneadipate/terephthalate, polytetramethyleneadipate/terephthalate, polybutylensuccinate/adipate, polybutylensuccinate/carbonate, poly-3-hydroxybutyrate/octanoate copolymer, poly-3-hydroxybutyrate/hexanoate/decanoate terpolymer. Furthermore, aliphatic polyesters may comprise, for example—but are not limited to—the class of poly(hydroxyalkanoates), in particular, poly(propiolactone), poly(butyrolactone), poly(pivalolactone), poly(valerolactone) and poly(caprolactone), polyethylenesuccinate, polypropylenesuccinate, polybutylenesuccinate, polyhexamethylenesuccinate, polyethyleneadipate, polypropyleneadipate, polybutyleneadipate, polyhexamethyleneadipate, polyethyleneoxalate, polypropyleneoxalate, polybutyleneoxalate, polyhexamethyleneoxalate, polyethylenesebacate, polypropylenesebacate, polybutylenesebacate and polylactic acid (PLA) as well as corresponding polyesters modified with polycarbonates or MBS. The term "polylactic acid (PLA)" designates a homo-polymer of preferably poly-L-lactide and any of its blends or alloys with other polymers; a co-polymer of lactic acid or lactide with other monomers, such as hydroxy-carboxylic acids, like for example glycolic acid, 3-hydroxy-butyric acid, 4-hydroxy-butyric acid, 4-hydroxyvaleric acid, 5-hydroxy-valeric acid, 6-hydroxy-caproic acid and cyclic forms thereof; the terms "lactic acid" or "lactide" include L-lactic acid, D-lactic acid, mixtures and dimers thereof, i.e. L-lactide, D-lactide, meso-lacide and any mixtures thereof.

19. Polycarbonates and polyester carbonates.

20. Polyketones.

21. Polysulfones, polyether sulfones and polyether ketones.

22. Crosslinked polymers derived from aldehydes on the one hand and phenols, ureas and melamines on the other hand, such as phenol/formaldehyde resins, urea/formaldehyde resins and melamine/formaldehyde resins.

23. Drying and non-drying alkyd resins.

24. Unsaturated polyester resins derived from copolyesters of saturated and unsaturated dicarboxylic acids with polyhydric alcohols and vinyl compounds as crosslinking agents, and also halogen-containing modifications thereof of low flammability.

25. Crosslinkable acrylic resins derived from substituted acrylates, for example epoxy acrylates, urethane acrylates or polyester acrylates.

26. Alkyd resins, polyester resins and acrylate resins crosslinked with melamine resins, urea resins, isocyanates, isocyanurates, polyisocyanates or epoxy resins.

27. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

28. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

29. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

30. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.

31. Aqueous emulsions of natural or synthetic rubber, e.g. natural latex or latices of carboxylated styrene/butadiene copolymers.

The organic material is preferably selected from the group consisting of linear low density polyethylene, low density polyethylene, high density polyethylene, ethylene-vinyl acetate copolymer, ethylene-butyl acrylate copolymer, and polypropylene homo- or copolymer.

The stabilizer mixture according to the present invention may be present in the organic material to be stabilized in an amount of preferably 0.005 to 10% or 0.005 to 5%, in particular 0.01 to 2.5% or 0.05 to 2%, relative to the weight of the organic material.

The individual components of the present stabilizer mixture may be added to the organic material to be stabilized either individually or mixed with one another. They can be added to a polymer before, during or after the polymerization or before or after the crosslinking.

The stabilizer composition according to the present invention or its individual components can be incorporated into the organic material to be stabilized by known methods, for example before or during shaping or by applying the dissolved or dispersed stabilizer to the organic material, if necessary with subsequent evaporation of the solvent. The stabilizers can be added to the organic material in the form of a powder, granules or a masterbatch, which contains said stabilizers in, for example, a concentration of from 2.5 to 90%, preferably 2.5 to 25%, by weight.

Examples of processing or transformation of the materials stabilized according to the present invention are:
Injection blow molding, extrusion, blow molding, rotomolding, in mold decoration (back injection), slush molding, injection molding, co-injection molding, forming, compression molding, pressing, film extrusion (cast film; blown film), fiber spinning (woven, nonwoven), drawing (uniaxial, biaxial), annealing, deep drawing, calandering, mechanical transformation, sintering, coextrusion, coating, lamination, crosslinking (radiation, peroxide, silane), vapor deposition, weld together, glue, vulkanization, thermoforming, pipe extrusion, profile extrusion, sheet extrusion; sheet casting, spin coating, strapping, foaming, recycling/rework, extrusion coating, visbreaking (peroxide, thermal), fiber melt blown, spun bonded, surface treatment (corona discharge, flame, plasma), sterilization (by gamma rays, electron beams), cast polymerization (R&M process, RAM extrusion), gel-coating, tape extrusion, GMT-process, SMC-process, plastisol, and dipping (PVC, latex).

The stabilized material may additionally also contain various conventional additives, for example:
1. Antioxidants
1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tertbutyl-4-hydroxybenzyl)malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-ditert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]undecane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-ditert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl] propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-disec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-secbutyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino] ethane, 1,2-bis(phenylamino)propane, (o-tolyl)biguanide, bis[4-(1,3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tertoctylphenothiazines, a mixture of mono- and dialkylated tert-octyl-phenothiazines, N-allylphenothiazine, N,N,N',N'-tetraphenyl-1,4-diaminobut-2-ene.

2. UV Absorbers and Light Stabilizers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl) phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tertbutyl-2'-hydroxy-5'-(2-methoxycarbonylethyl)phenyl)-5-chloro-benzotriazole, 2-(3'-tertbutyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-

[2-(2-ethylhexyloxy)carbonylethyl]-2'-hydroxyphenyl) benzotriazole, 2-(3'-dodecyl-2'-hydroxy-5'-methylphenyl) benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$COO—CH$_2$CH$_2$—]$_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]benzotriazole; 2-[2'-hydroxy-3'-(1,1,3,3-tetramethylbutyl)-5'-(α,α-dimethylbenzyl)-phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-ditert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-6-methyl-p-methoxycinnamate, methyl α-carbomethoxy-p-methoxycinnamate, N-(β-carbomethoxy-(β-cyanovinyl)-2-methylindoline, neopentyl tetra(α-cyano-β,β-diphenylacrylate.

2.5. Nickel compounds, for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example carbonic acid bis(1-undecyloxy-2,2,6,6-tetramethyl-4-piperidyl)ester, bis (2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis (1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4.5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bisformyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly [methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)oxymethyl-3,3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis [(1-cyclohexyloxy-2,2,6,6-piperidine-4-yl)butylamino]-6-chloro-s-triazine with N,N'-bis(3-aminopropyl) ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)amino)-s-triazine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxydisubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(hydroxy-4-octyloxyphenyl)-4,6-bis(4-methylphenyl)-1,3,5-triazine, 2-(2-hydroxy-4-dodecyloxyphenyl)-4,6-bis (2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy) phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2- hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine, 2,4-bis(4-biphenylyl)-6-[2-hydroxy-4-(2-ethylhexyloxy)phenyl]-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tertbutylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-ditert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2''-nitrilo[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane, phosphorous acid, mixed 2,4-bis(1,1-dimethylpropyl)phenyl and 4-(1,1-dimethylpropyl)phenyl triesters (CAS: 939402-02-5), phosphorous acid, triphenyl ester, polymer with α-hydro-ω-hydroxypoly[oxy(methyl-1,2-ethanediyl)], C10-16-alkyl esters (CAS: 1227937-46-3).

The following phosphites are especially preferred:

Tris(2,4-di-tert-butylphenyl) phosphite (Irgafos® 168, Ciba Specialty Chemicals Inc.), tris(nonylphenyl) phosphite,

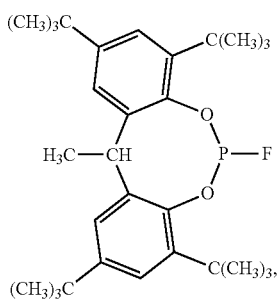
(A)

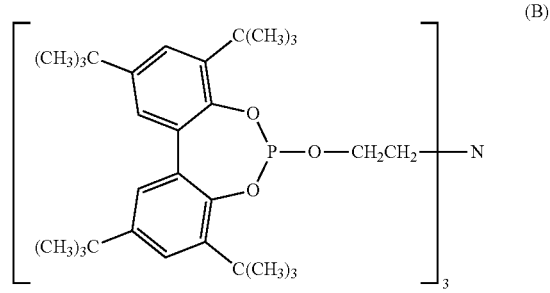
(B)

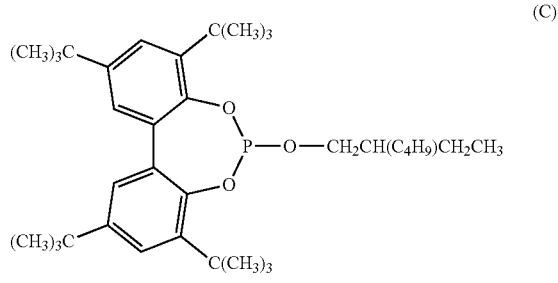
(C)

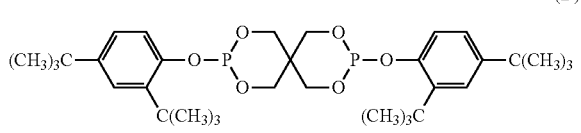
(D)

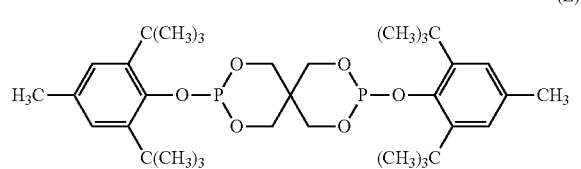
(E)

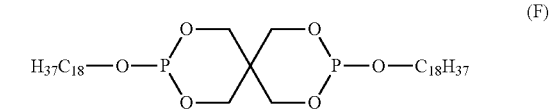
(F)

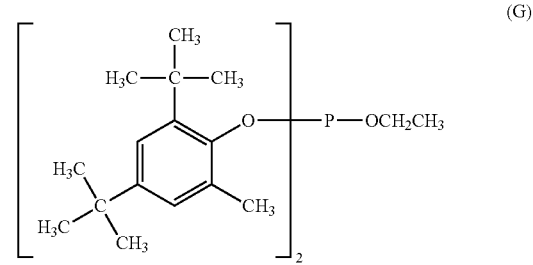
(G)

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alphahexadecylnitrone, nitrone derived from N,N-dialkylhydroxylamine derived from hydrogenated tallow amine.

7. Thiosynergists, for example dilauryl thiodipropionate, dimistryl thiodipropionate, distearyl thiodipropionate or distearyl disulfide.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilizers, for example copper salts in combination with iodides and/or phosphorus compounds and salts of divalent manganese.

10. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

12. Fillers and reinforcing agents, for example calcium carbonate, silicates, surface treated silica (as described e.g. in US-A-2007/60,697 and US-A-2009/111,918), glass fibres, glass beads, asbestos, talc, kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839, EP-A-0591102; EP-A-1291384 or 3-[4-(2-acetoxyethoxy)phenyl]-5,7-di-tert-butylbenzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one, 3-(2-acetyl-5-isooctylphenyl)-5-isooctylbenzofuran-2-one.

The weight ratio of the present stabilizer mixture to the total amount of the conventional additive(s) can be for example 100:1 to 1:1000 or 10:1 to 1:100 or 20 to 1 to 1 to 20 or 10:1 to 1:10.

A further embodiment of the present invention is a composition which additionally contains a further additive selected from the group consisting of antioxidants, slip agents, anti-block agents, thermal fillers, pigments, anti-fog and anti-mist agents.

The materials stabilized according to this invention can be used in a wide variety of forms, for example as films, fibres, tapes, moulding compositions, profiles or as binders for paints, adhesives or putties.

In more detail, the materials stabilized according to the present invention may be used for the preparation of the following devices:

I-1) Automotive applications, in particular bumpers, dashboards, battery, rear and front linings, moldings parts under the hood, hat shelf, trunk linings, interior linings, air bag covers, electronic moldings for fittings (lights), panes for dashboards, headlamp glass, instrument panel, exterior linings, upholstery, automotive lights, head lights, parking lights, rear lights, stop lights, interior and exterior trims; door panels; gas tank; glazing front side; rear windows; seat backing, exterior panels, wire insulation, profile extrusion for sealing, cladding, pillar covers, chassis parts, exhaust systems, fuel filter/filler, fuel pumps, fuel tank, body side mouldings, convertible tops, exterior mirrors, exterior trim, fasteners/fixings, front end module, glass, hinges, lock systems, luggage/roof racks, pressed/stamped parts, seals, side impact protection, sound deadener/insulator and sunroof.

I-2) Devices for plane, railway, motor car (car, motorbike) including furnishings.

I-3) Devices for space applications, in particular rockets and satellites, e.g. reentry shields.

I-4) Devices for architecture and design, mining applications, acoustic quietized systems, street refuges, and shelters.

II-1) Electric appliances, in particular washing machines, tumblers, ovens (microwave oven), dish-washers, mixers, and irons.

II-2) Foils for condensers, refrigerators, heating devices, air conditioners, encapsulating of electronics, semi-conductors, coffee machines, and vacuum cleaners.

III-1) Technical articles such as cogwheel (gear), slide fittings, spacers, screws, bolts, handles, and knobs.

III-2) Rotor blades, ventilators and windmill vanes, solar devices, swimming pools, swimming pool covers, pool liners, pond liners, closets, wardrobes, dividing walls, slat walls, folding walls, roofs, shutters (e.g. roller shutters), fittings, connections between pipes, sleeves, and conveyor belts.

III-3) Profiles of any geometry (window panes) and siding.

III-4) Glass substitutes, in particular extruded plates, glazing for buildings (monolithic, twin or multiwall), aircraft, schools, extruded sheets, window film for architectural glazing, train, transportation, sanitary articles, and greenhouse.

III-5) Plates (walls, cutting board), extrusion-coating (photographic paper, tetrapack and pipe coating), silos, wood substitute, plastic lumber, wood composites, walls, surfaces, furniture, decorative foil, floor coverings (interior and exterior applications), flooring, duck boards, and tiles.

III-6) Cement-, concrete-, composite-applications and covers, siding and cladding, hand rails, banisters, kitchen work tops, roofing, roofing sheets, tiles, and tarpaulins.

IV-1) Plates (walls and cutting board), trays, artificial grass, astroturf, artificial covering for stadium rings (athletics), artificial floor for stadium rings (athletics), and tapes.

V-1) Plastic films in general (packaging, dump, laminating, swimming pools covers, waste bags, wallpaper, stretch and shrink wrap, raffia, desalination film, batteries, and connectors).

V-2) Agricultural films (greenhouse covers, tunnel, mulch, silage, bale wrap), especially in presence of intensive application of agrochemicals).

VI-1) Food packing and wrapping (flexible and solid), BOPP, BOPET, bottles.

VI-2) Cartridges, syringes, medical applications, containers for any transportation, waste baskets and waste bins, waste bags, bins, dust bins, bin liners, wheely bins, container in general, tanks for water/used water/chemistry/gas/oil/gasoline/diesel; tank liners, boxes, crates, battery cases, troughs, medical devices such as piston, ophthalmic applications, diagnostic devices, and packing for pharmaceuticals blister.

VII-1) Devices of filled polymers (talc, chalk, china clay (kaolin), wollastonite, pigments, carbon black, $TiO_2$, mica, nanocomposites, dolomite, silica, silicates, glass, asbestos).

Thus, another embodiment of the present invention is an article made of a composition as described above. A plastic article for agricultural use, preferably a thin film, typically obtained with the blow extrusion technology, is preferred. A monolayer film or a multilayer film of three, five or seven layers, preferably of a thickness of 180 microns or 120 microns, typically 60 to 100 microns, is of particular interest. The most important application of thin plastic films in agriculture is as covers for greenhouses and tunnels to grow crops in a protected environment.

A multilayer film, preferably a multilayer polyolefin film, in particular a multilayer polyethylene film, which contains a compound of the formula (A) in at least one layer and a compound of the formula (B) in another layer, is also preferred.

Such a multilayer film is typically made of three, five or seven layers. This can lead to a film structure like A-B-A, A-B-C, A-B-C-B-A, A-B-C-B-D, A-B-C-D-C-B-A or A-A-B-C-B-A-A. A, B, C, D represent the different polymers and tackifiers mentioned in the following.

However, adjacent layers can also be coupled so that the final film article can be made of an even number of layers, i.e. two, four or six layers such as A-A-B-A, A-A-B-B, A-A-B-A-A, A-B-B-A-A, A-A-B-C-B, A-A-B-C-A-A and the like.

The thin films containing one of the aforementioned light stabilizers are typically made of low density polyethylene (from radical polymerization or of the linear type), linear low density polyethylene, metallocene linear low density polyethylene, C4-LLDPE, C8-LLDPE, medium density polyethylene, ethylene-vinyl acetate copolymer, ethylene-vinyl alcohol copolymer, ethylene-butyl acrylate copolymer, ethylene-methyl acrylate copolymer, and combinations thereof, of polypropylene, (either homo- and co-polymer) or of high density polyethylene. This can include multilayers of the same polymer type with different viscosity or co-monomer content (e.g. vinyl-acetate content) or virgin polymer and regrind or recyclate. This can include a strength layer of polyamide 6 and polyamide 6.6 or tie layers of polyisobutylene, maleic anhydride grafted polyethylene, maleic anhydride grafted polypropylene or a layer of biodegradable resins. Such combinations are optimized for example to maximize the initial mechanical properties (tensile strength, puncture resistance, impact resistance, elongation properties) of the plastic article, improve inter-layer adhesion strength or to achieve special functionalities (gas barrier properties, transparency, heat seal properties) of the same.

The stabilizer mixture according to the present invention is particularly useful for stabilizing greenhouse film covers, which are in contact with an agrochemical compound such as e.g. Metam-Sodium (Sodium N-methyldithiocarbamate), Cymoxanil (2-Cyan-N-[(ethylamino)carbonyl]-2-(methoxyimino)acetamide), Thiram (Bis(dimethylthiocarbamoyl)disulfide), Mancozeb (Mn—Zn-ethylenebis(dithiocarbamate)) or elemental sulfur, in particular elemental sulfur or Metam-Sodium.

Thus, a further embodiment of the present invention is a greenhouse film cover which is in contact with an agrochemical compound.

Still a further embodiment of the present invention is a method for stabilizing an organic material, preferably an organic polymer, against degradation induced by light, heat, oxidation or the effect of agrochemical compounds, which comprises incorporating into the organic material a stabilizer mixture as defined above.

The following examples illustrate the invention in greater detail. All percentages and parts are by weight, unless stated otherwise.

EXAMPLES

Stabilizers Listed in Tables 1, 2, 3 and 4 Below:

Compound (A-1)

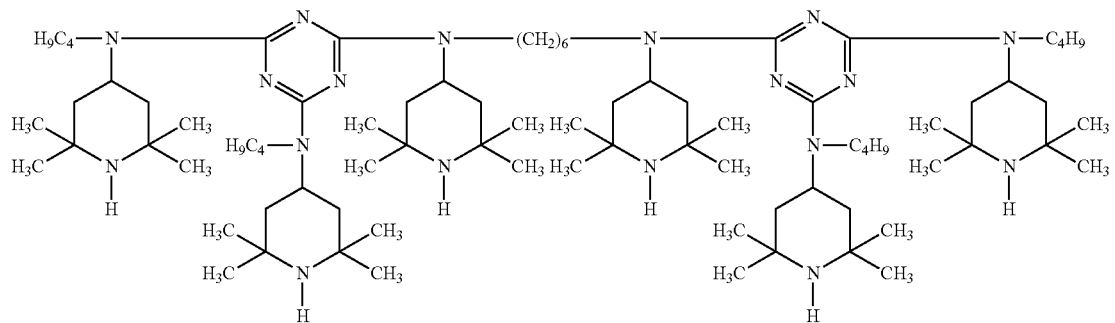

Compound (A-2)
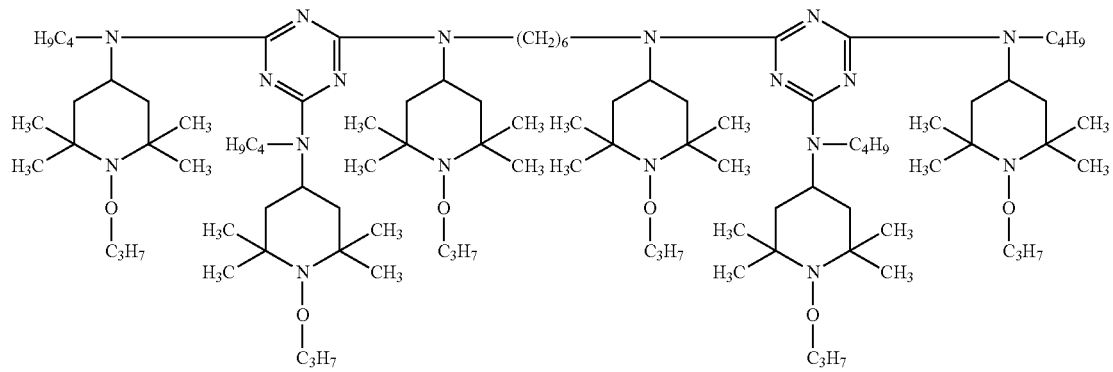
Compound (A-3-1)
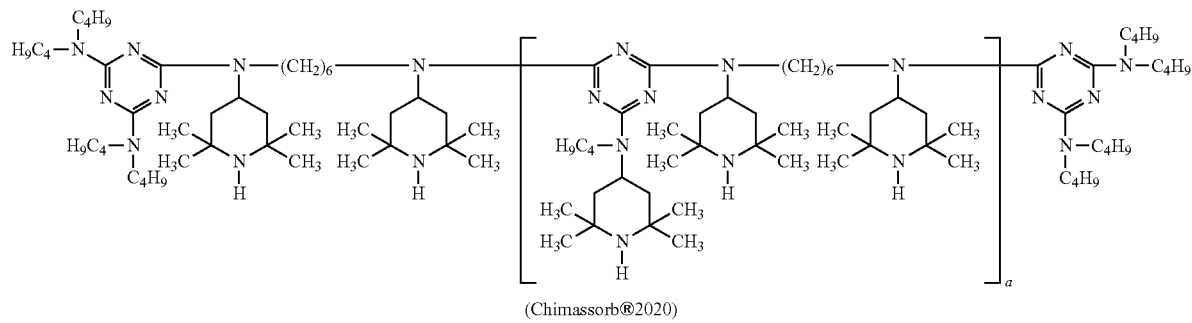
(Chimassorb®2020)
wherein a is a number from 1 to 10.
Compound (A-4-1)
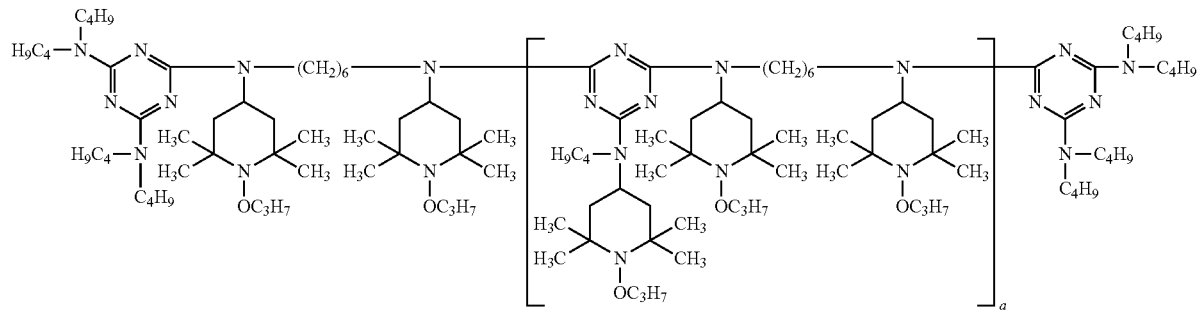
wherein a is a number from 1 to 10.

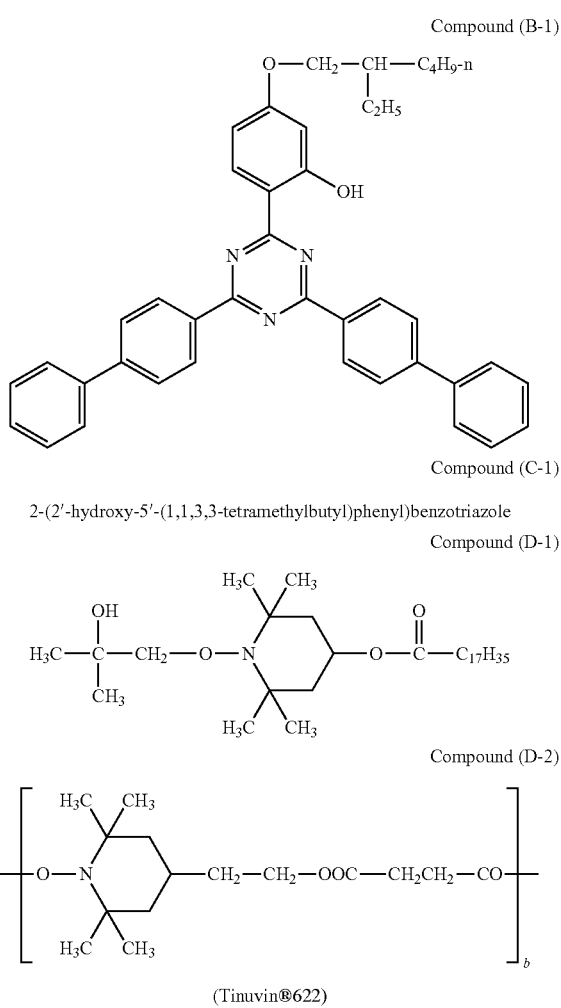

wherein b is a number from 2 to 10.

A) Preparation of the Film Samples:

Stabilization of LDPE (low density polyethylene) multilayer films: Formulations containing LDPE powder (Polimeri Europa Riblene® FC 30, characterized by a density of 0.922 g/cm$^3$ and a melt flow index (190° C./2.16 Kg) of 0.27 g/10 min), 0.04% by weight, relative to the weight of the LDPE, of tris{2,4-di-tert-butylphenyl} phosphite, 0.01% by weight, relative to the weight of the LDPE, of octadecyl 3-(3,5-di-tert-butyl-4-hydroxyphenyl)propionate and the stabilizer mixtures indicated in Tables 1, 2 and 4, are prepared. The formulations are mixed in a turbo-mixer. Each formulation is extruded at a maximum temperature of 200° C. in a lab-scale single-screw Collin extruder (ø 42 mm, L/D=25). Then, each final formulation is blown in a lab-scale Collin® 5-layer blow-extruder (ø 20-25-30 mm, L/D 25), at a maximum temperature of 210° C., to give a 5-layer film of overall 180 μm thickness (55 μm-7.5 μm-55 μm-7.5 μm-55 μm), having the same formulation in all layers.

Test Method A-I:

An agrochemical treatment is carried out on the prepared films before artificial weathering. Specimens of the films for each formulation are mounted on a small experimental greenhouse (geographical coordinates: Lat. 44°25'40"N Long. 11°16'39"E), inside of which two burners of the type used in common agricultural practice are placed to allow sublimation of elemental sulfur, a widely used fungicide. The so-called "sulfur burning" is carried out for 13 consecutive days, 6 hours per day, while the films are mounted on the small experimental greenhouse. The film specimens are covered with an additional single piece of opaque film to minimize the direct exposure of the sample to sunlight, in order to minimize in turn the effects of solar irradiation and hence the possible differences on samples exposed in subsequent test series. The amount of burnt sulfur is regulated and the weathering conditions closely monitored, so as to obtain the desired level of contamination from sulfur in the film samples, measured by Inductively Coupled Plasma.

After the agrochemical treatment, the film specimens for each formulation are exposed in an Atlas Weather-O-Meter (WOM, as per ASTM G155, 0.35 W/m2 at 340 nm, dry cycle), for accelerated light weathering. Specimens of the film samples are taken at defined intervals of time after exposure and underwent tensile testing. The residual tensile strength is measured, by means of a Zwick® Z1.0 constant velocity tensiometer (as per modified ISO 527), in order to evaluate the decay of the mechanical properties of the film samples, as a consequence of the polymer degradation after its oxidation. The test results are listed in Table 1:

TABLE 1

Film samples contaminated up to level of sulfur of 5000 ppm and exposed in a WOM.

| Stabilizer mixture | Weight ratio of components (A) to (B) | Time until retained elongation at break in hours is 50% of the initial value |
|---|---|---|
| 1.000% of Compound (A-4-1) 0.030% of Compound (B-1) 0.097% of Compound (C-1) | 33/1 | 6000 |
| 0.900% of Compound (A-4-1) 0.030% of Compound (B-1) 0.097% of Compound (C-1) 0.100% of Compound (D-1) | 33/1 | 6000 |
| 0.700% of Compound (A-4-1) 0.300% of Compound (A-3-1) 0.03% of Compound (B-1) 0.097% of Compound (C-1) | 33/1 | 6000 |
| 0.700% of Compound (A-4-1) 0.300% of Compound (D-2) 0.03% of Compound (B-1) 0.097% of Compound (C-1) | 33/1 | 6000 |
| 0.700% of Compound (A-4-1) 0.03% of Compound (B-1) 0.097% of Compound (C-1) 0.100% of Compound (D-1) 0.200% of Compound (D-2) | 23/1 | 6000 |

% means % by weight, relative to the weight of LDPE.

Test Method A-II:

Specimens of the multilayer films are put into a dryer. The dryer is immersed into a water bath kept at 30° C. The films inside the dryer are hanged over a 2 liter solution containing 836 ml of a commercial solution of metam-sodium (Sodium N-methyldithiocarbamate). The films are stored in the dryer for 20 days. This simulates an agrochemical treatment in presence of the films.

After the agrochemical treatment, the film specimens for each formulation are exposed in an Atlas Weather-O-Meter (WOM, as per ASTM G155, 0.35 W/m2 at 340 nm, dry cycle), for accelerated light weathering. Specimens of the film are taken at defined intervals of time after exposure and underwent tensile testing. The residual tensile strength is measured, by means of a Zwick® Z1.0 constant velocity tensiometer (as per modified ISO 527), in order to evaluate the decay of the mechanical properties of the plastic film, as a consequence of the polymer degradation after its oxidation. The results are listed in Table 2.

TABLE 2

Film samples contaminated up to level of sulfur of 5000 ppm using Metam-Sodium and exposed in a WOM.

| Stabilizer mixture | Weight ratio of components (A) to (B) | Time until retained elongation at break in hours is 50% of the initial value |
|---|---|---|
| 1.000% of Compound (A-4-1) 0.030% of Compound (B-1) 0.097% of Compound (C-1) | 33/1 | 7000 |
| 0.900% of Compound (A-4-1) 0.030% of Compound (B-1) 0.097% of Compound (C-1) 0.100% of Compound (D-1) | 30/1 | 7000 |
| 0.700% of Compound (A-4-1) 0.300% of Compound (A-3-1) 0.03% of Compound (B-1) 0.097% of Compound (C-1) | 33/1 | 7000 |
| 0.700% of Compound (A-4-1) 0.030% of Compound (B-1) 0.097% of Compound (C-1) 0.300% of Compound (D-2) | 23/1 | 7000 |
| 0.700% of Compound (A-4-1) 0.030% of Compound (B-1) 0.097% of Compound (C-1) 0.100% of Compound (D-1) 0.200% of Compound (D-2) | 23/1 | 7000 |

% means % by weight, relative to the weight of LDPE.

B) Preparation of the Film Samples:

Stabilization of LDPE (low density polyethylene) monolayer films: Formulations containing LDPE powder (Polimeri Europa Riblene® FF 29, characterized by a density of 0.921 g/cm³ and a melt flow index (190° C./2.16 Kg) of 0.60 g/10 min), 0.04% by weight of tris{2,4-di-tert-butylphenyl} phosphite, 0.01% by weight of octadecyl 3-(3,5-di-tertbutyl-4-hydroxyphenyl)propionate and the stabilizer mixture indicated in Table 3 are prepared. The formulations are mixed in a turbo-mixer. Each formulation is extruded at a maximum temperature of 200° C. in a OMC twin-screw extruder (ø 19 mm, L/D=25). Then, each final formulation is blown in a Dolci mono-layer blow-extruder (ø 40 mm, L/D 26), at a maximum temperature of 210° C., to give a mono-layer film of overall 150 µm thickness.

Text Method B-1:

Specimens of the monolayer films are put into a dryer. The dryer is immersed into a water bath kept at 30° C. The films inside the dryer are hanged over a 2 liter solution containing 836 ml of a commercial solution of metam-sodium (Sodium N-methyldithiocarbamate). The films are stored in the dryer for 20 days. This simulates an agrochemical treatment in presence of the films. After the agrochemical treatment, the film specimens of each formulation are exposed in an Atlas Weather-O-Meter (WOM, as per ASTM G155, 0.35 W/m2 at 340 nm, dry cycle), for accelerated light weathering. Specimens of the required formulations are taken at defined intervals of time after exposure and underwent tensile testing. The residual tensile strength is measured, by means of a Zwick® Z1.0 constant velocity tensiometer (as per modified ISO 527), in order to evaluate the decay of the mechanical properties of the plastic film, as a consequence of the polymer degradation after its oxidation. The results are listed in Table 3.

TABLE 3

Film samples contaminated up to level of sulfur of 5000 ppm using Metam-Sodium and exposed in a WOM.

| Stabilizer mixture | Weight ratio of components (A) to (B) | Retained elongation at break (as % of initial) after 6000 hours WOM + treatment |
|---|---|---|
| 0.600% of Compound (A-4-1) 0.025% of Compound (B-1) | 24/1 | 80 |

% means % by weight, relative to the weight of LDPE.

The following stabilizer mixtures also show an excellent stabilizing effect of LDPE film samples in the above described test methods.

TABLE 4

| Stabilizer mixture | Weight ratio of components (A) to (B) |
|---|---|
| 1.000% of Compound (A-4-1) 0.030% of Compound (B-1) | 33/1 |
| 1.000% of Compound (A-2) 0.030% of Compound (B-1) | 33/1 |
| 0.500% of Compound (A-1) 0.500% of Compound (A-2) 0.030% of Compound (B-1) | 33/1 |
| 0.666% of Compound (A-1) 0.333% of Compound (A-2) 0.030% of Compound (B-1) | 33/1 |
| 0.750% of Compound (A-1) 0.250% of Compound (A-2) 0.030% of Compound (B-1) | 33/1 |
| 0.500% of Compound (A-2) 0.015% of Compound (B-1) 0.049% of Compound (C-1) 0.050% of Compound (D-1) | 33/1 |
| 0.275% of Compound (A-1) 0.275% of Compound (A-2) 0.015% of Compound (B-1) 0.049% of Compound (C-1) | 37/1 |
| 0.367% of Compound (A-1) 0.183% of Compound (A-2) 0.015% of Compound (B-1) 0.049% of Compound (C-1) | 37/1 |
| 0.413% of Compound (A-1) 0.137% of Compound (A-2) 0.015% of Compound (B-1) 0.049% of Compound (C-1) | 37/1 |
| 0.350% of Compound (A-2) 0.015% of Compound (B-1) 0.049% of Compound (C-1) 0.050% of Compound (D-1) 0.150% of Compound (D-2) | 23/1 |
| 0.350% of Compound (A-4-1) 0.015% of Compound (B-1) 0.049% of Compound (C-1) 0.050% of Compound (D-1) 0.150% of Compound (D-2) | 23/1 |

% means % by weight, relative to the weight of LDPE.

The invention claimed is:
1. A stabilizer mixture, comprising components (A) and (B), wherein:
component (A) is at least one compound of formula (A),

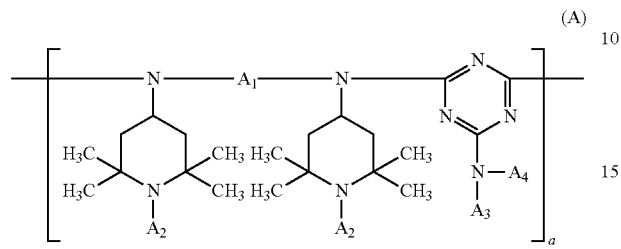
(A)

wherein $A_1$ is $C_2$-$C_{18}$alkylene, $C_5$-$C_7$cycloalkylene or $C_1$-$C_4$alkylenedi($C_5$-$C_7$cycloalkylene),
$A_2$ independently of one another are hydrogen, $C_1$-$C_{12}$alkyl, $C_1$-$C_{12}$alkyloxy, $C_5$-$C_{12}$cycloalkyl or $C_5$-$C_{12}$cycloalkyloxy,
$A_3$ and $A_4$ independently of one another are hydrogen, $C_1$-$C_{12}$alkyl, $C_5$-$C_{12}$cycloalkyl or a group of formula (a-1),

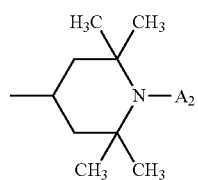
(a-1)

or $A_3$ and $A_4$, together with the nitrogen atom to which they are bonded, form a 5- to 10-membered heterocyclic ring and a is a number from 1 to 20 and the repeating units are identical or different;
component (B) is at least one compound of formula (B), (B)

wherein $E_1$ is $C_1$-$C_{18}$alkyl and
$E_2$, $E_3$, $E_4$ and $E_5$ independently of one another are hydrogen, $C_1$-$C_{18}$alkyl, phenyl or phenyl substituted by 1, 2 or 3 $C_1$-$C_4$alkyl; and
a weight ratio of (A) to (B) is 23/1 to 40/1.

2. The stabilizer mixture of claim 1, wherein
$A_1$ is $C_2$-$C_8$alkylene or cyclohexylene,
$A_2$ independently of one another are hydrogen, $C_1$-$C_8$alkyl, $C_1$-$C_{12}$alkyloxy, cyclohexyl or cyclohexyloxy,
$A_3$ and $A_4$ independently of one another are hydrogen, $C_1$-$C_8$alkyl or a group of formula (a-1) or $A_3$ and $A_4$, together with the nitrogen atom to which they are bonded, form a morpholino group and
a is a number from 1 to 10; and
$E_1$ is $C_1$-$C_8$alkyl and
$E_2$, $E_3$, $E_4$ and $E_5$ independently of one another are hydrogen, $C_1$-$C_4$alkyl or phenyl.

3. The stabilizer mixture of claim 1, wherein component (A) is at least one compound selected from formulae (A-0), (A-1), (A-2), (A-3) and (A-4):

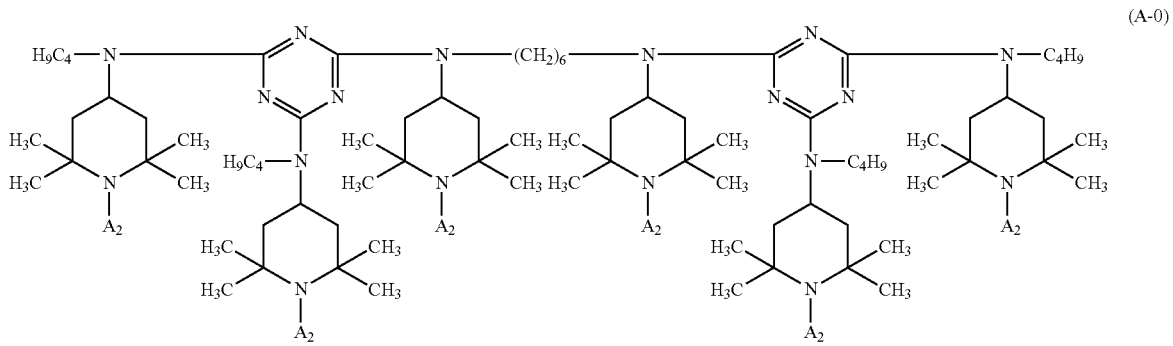
(A-0)

wherein 1 or 2 of $A_2$ are hydrogen and the remaining $A_2$ are propyloxy;
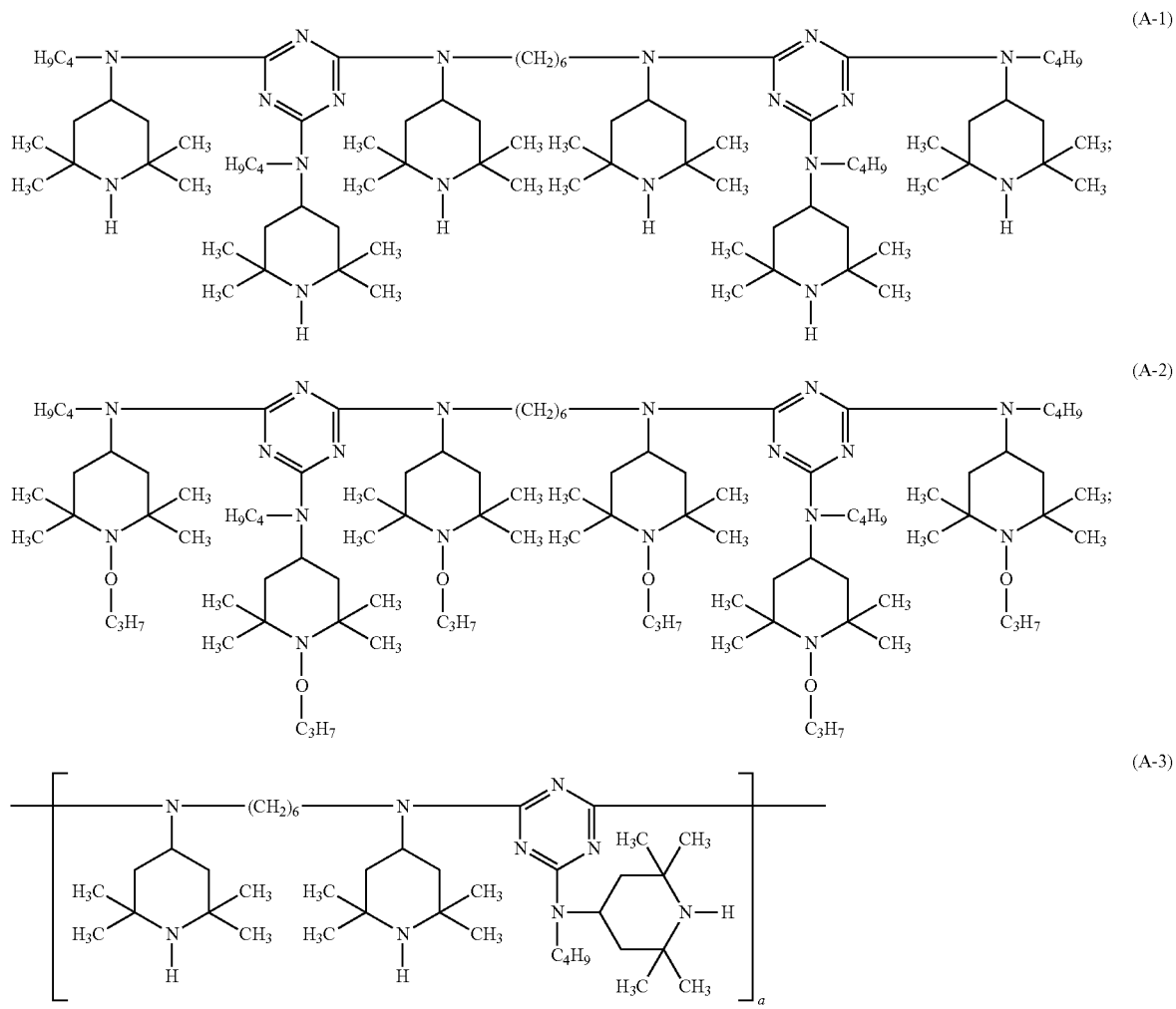
(A-1)
(A-2)
(A-3)
wherein a is a number from 1 to 20;
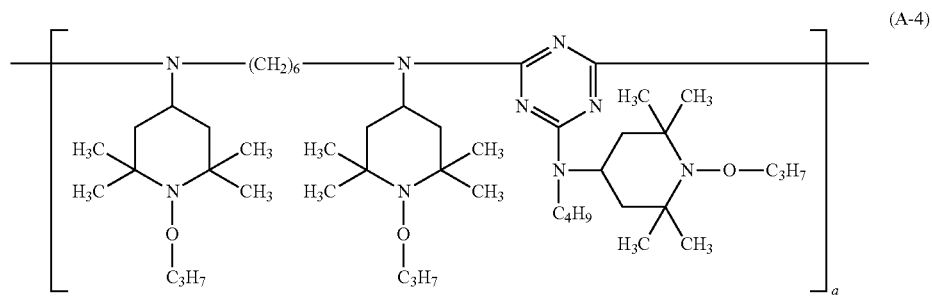
(A-4)
wherein a is a number from 1 to 20.

4. The stabilizer mixture of claim 1, wherein component (B) is at least one compound selected from formulae (B-1), (B-2) and (B-3);

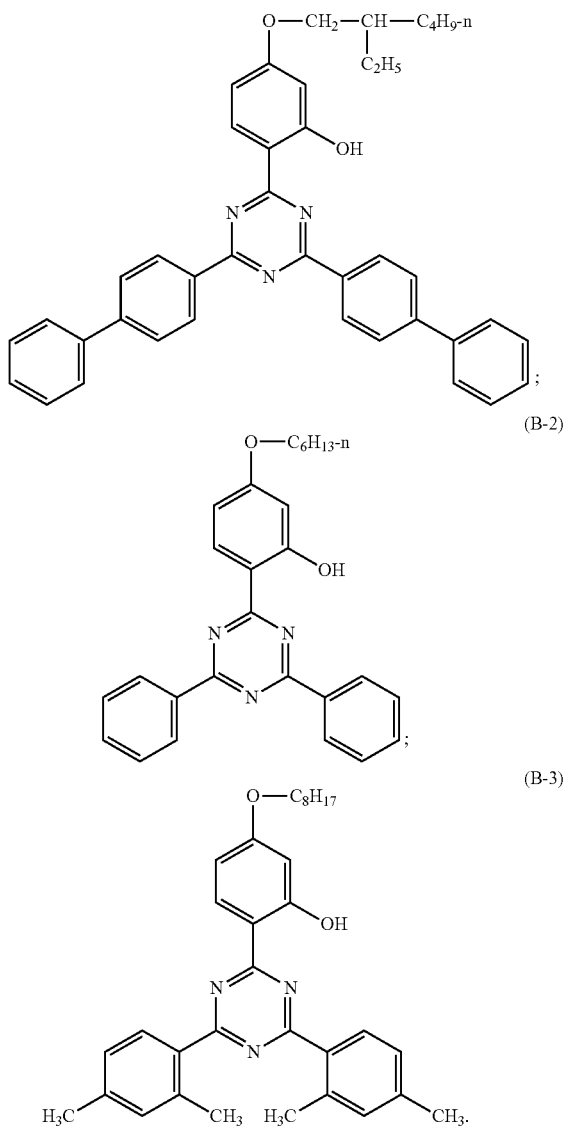

5. The stabilizer mixture of claim 1, further comprising component (C) which is a benzotriazole.

6. The stabilizer mixture of claim 1, further comprising component (D) which is at least one compound selected from formulae (D-1) and (D-2);

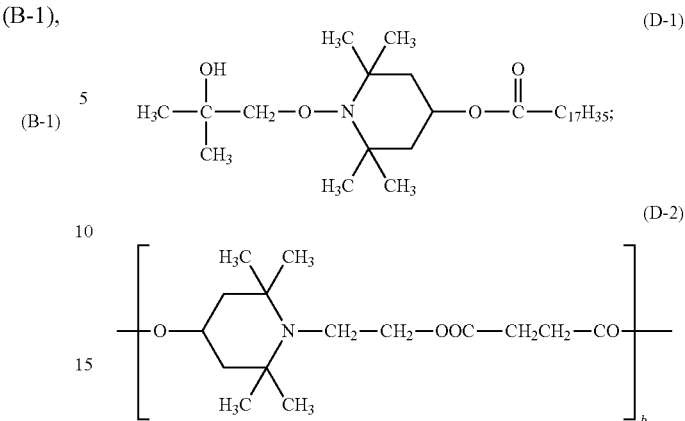

wherein b is a number from 2 to 20.

7. A composition comprising:
(I) an organic material subject to degradation induced by light, heat, oxidation or an agrochemical compound; and
(II) the stabilizer mixture of claim 1.

8. The composition of claim 7, wherein the organic material is selected from the group consisting of linear low density polyethylene, low density polyethylene, high density polyethylene, ethylene-vinyl acetate copolymer, ethylene-butyl acrylate copolymer, and polypropylene homo- or copolymer.

9. The composition of claim 7, further comprising an additive selected from the group consisting of an antioxidant, a slip agent, an anti-block agent, a thermal filler, a pigment, an anti-fog agent and an anti-mist agent.

10. An article, which is made of the composition of claim 7.

11. The article of claim 10, which is a monolayer film or a multilayer film of three to seven layers.

12. The article of claim 10, which is a multilayer film which comprises a compound of formula (A) in at least one layer and a compound of formula (B) in another layer.

13. The article of claim 10, which is a greenhouse film cover.

14. The article of claim 13, wherein the greenhouse film cover contacts an agrochemical compound.

15. A method for stabilizing an organic material against degradation induced by light, heat, oxidation or an effect of an agrochemical compound, the method comprising incorporating the stabilizer mixture of claim 1 into the organic material.

* * * * *